United States Patent
Ellisor et al.

(10) Patent No.: US 10,344,896 B2
(45) Date of Patent: Jul. 9, 2019

(54) VERTICAL RATCHETING ANTI-ROTATION DEVICE

(71) Applicant: Dril-Quip, Inc., Houston, TX (US)

(72) Inventors: Scott P. Ellisor, Spring, TX (US); Christopher C. Mayer, Houston, TX (US); John E. Nelson, Houston, TX (US); Mark Manning, Houston, TX (US)

(73) Assignee: Dril-Quip, Inc., Houston, TX (US)

( * ) Notice: Subject to any disclaimer, the term of this patent is extended or adjusted under 35 U.S.C. 154(b) by 275 days.

(21) Appl. No.: 15/429,589

(22) Filed: Feb. 10, 2017

(65) Prior Publication Data
US 2018/0231155 A1  Aug. 16, 2018

(51) Int. Cl.
*F16L 15/08* (2006.01)
*E21B 17/043* (2006.01)

(52) U.S. Cl.
CPC ............ *F16L 15/08* (2013.01); *E21B 17/043* (2013.01)

(58) Field of Classification Search
CPC ............................... F16L 15/08; E21B 17/043
USPC .......................................................... 285/92
See application file for complete search history.

(56) References Cited

U.S. PATENT DOCUMENTS

| | | | | |
|---|---|---|---|---|
| 643,358 A | * | 2/1900 | Konold ................. | F16L 37/252 285/85 |
| 1,064,527 A | * | 6/1913 | Norris ................... | E21B 17/043 279/100 |
| 1,067,878 A | * | 7/1913 | Owen et al. .......... | E21B 17/043 279/100 |
| 1,390,931 A | * | 9/1921 | Shamberger .......... | E21B 17/043 279/100 |
| 1,407,335 A | * | 2/1922 | Reynolds .............. | F16L 15/006 285/85 |
| 1,487,489 A | * | 3/1924 | Streda ................... | E21B 17/043 279/100 |
| 1,540,374 A | * | 6/1925 | Stevens ................. | B25D 17/04 285/92 |

(Continued)

FOREIGN PATENT DOCUMENTS

| | | |
|---|---|---|
| GB | 2539103 A | 12/2016 |
| GB | 2540037 A | 1/2017 |

OTHER PUBLICATIONS

Search report issued in related GB application No. 1802171.7, dated May 17, 2018 (4 pages).

*Primary Examiner* — David Bochna
(74) *Attorney, Agent, or Firm* — Baker Botts L.L.P.

(57) ABSTRACT

In one embodiment, a vertical ratcheting anti-rotation device includes a ratchet mechanism pivotally coupled at a proximal end to a first tubular member in a first recessed area located on a shoulder of the first tubular member. A distal end of the ratchet mechanism includes a first plurality of angled teeth and a spring allowing the ratchet mechanism to pivot in a vertical direction within the first recessed area. The anti-rotation device may also include a toothed insert mechanically coupled to a second tubular member in a second recessed area located on a shoulder of the second tubular member. The toothed insert may include a second plurality of angled teeth positioned to engage the first plurality of angled teeth of the ratchet mechanism. The spring is compressible during coupling of the tubular members to allow the ratchet mechanism to move vertically over the second plurality of angled teeth.

20 Claims, 8 Drawing Sheets

(56) References Cited

U.S. PATENT DOCUMENTS

| | | | | |
|---|---|---|---|---|
| 1,691,599 A * | 11/1928 | Zimmermann | ........ | B25D 17/04 |
| | | | | 285/92 |
| 1,717,186 A * | 6/1929 | Cargle | .................. | E21B 17/043 |
| | | | | 279/100 |
| 1,776,280 A * | 9/1930 | Boyd | .................... | E21B 17/043 |
| | | | | 285/91 |
| 2,118,350 A * | 5/1938 | Holt | ...................... | E21B 17/043 |
| | | | | 285/333 |
| 3,069,187 A * | 12/1962 | Collims | ................ | F16L 17/063 |
| | | | | 285/93 |
| 4,940,260 A * | 7/1990 | Uriarte Odriozola | ...................... | |
| | | | | F16L 19/005 |
| | | | | 285/92 |
| 5,957,716 A * | 9/1999 | Buckley | ............... | H01R 13/622 |
| | | | | 285/92 |
| 6,824,170 B2 * | 11/2004 | Lee | ....................... | F16L 37/086 |
| | | | | 285/92 |
| 10,161,211 B2 * | 12/2018 | Travis | ................... | E21B 17/043 |
| 2005/0258640 A1 | 11/2005 | Otten et al. | | |
| 2007/0049093 A1 | 3/2007 | Otten et al. | | |
| 2014/0103640 A1 * | 4/2014 | O'Dell | .................. | E21B 17/043 |
| | | | | 285/91 |
| 2014/0103645 A1 * | 4/2014 | Steen | ...................... | F16L 15/08 |
| | | | | 285/330 |
| 2014/0167408 A1 * | 6/2014 | Steen | ...................... | F16L 15/08 |
| | | | | 285/330 |
| 2016/0369920 A1 * | 12/2016 | Pallini, Jr. | ................ | F16L 15/08 |
| 2017/0101828 A1 * | 4/2017 | McGowan | ............ | E21B 17/043 |

* cited by examiner

VERTICAL RATCHETING ANTI-ROTATION DEVICE

TECHNICAL FIELD

The present disclosure relates generally to connector assemblies and, more particularly, to a vertical ratcheting anti-rotation device.

BACKGROUND

Offshore oil and gas drilling operations typically include the make-up of strings of pipe or casing members, frequently of relatively large diameter. The string of tubular members may be driven into the ground or submerged in water. In some situations, the string of tubular members may be used as conduits through which a well may be initiated. The joint between members of such tubular strings must provide both structural strength and fluid pressure integrity. Such features of a joint might be provided, for example, by welding. However, because welding is a time-consuming operation, and drilling rig rates are high, particularly offshore, mechanical connectors are generally preferred. Typical mechanical connectors available include threaded type connectors in which tubular members are mutually rotated to thread a pin and box connector assembly, breach block connectors, and snap lock connectors.

In threaded mechanical connector assemblies, an externally threaded end, known as the pin, mates with an internally threaded section, known as the box. The pin and the box on a threaded connector assembly are designed to be engaged with each other and rotated to a specific torque value for connecting the ends. After the connection is made, anti-rotation devices can be installed to secure the pin and the box together at the desired make-up torque. The anti-rotation devices are designed to ensure that the threaded portions of the connector assembly do not become tightened over the desired make-up torque or loosened from each other in response to forces applied to the pipe or casing members in the string.

Existing anti-rotation devices often feature a mechanical key that can be selectively positioned in a recess between the pin and the box of the connector assembly to prevent rotation of the pin and the box relative to each other in a certain direction once the make-up torque is reached. Unfortunately, these keys typically do not go into action to engage with the connector assembly until after the connection is loosened slightly. That is, the keys are generally first positioned in the recesses of the connector assembly, and then the pin and box are rotated slightly relative to each other to energize the key. As a result, the connection may be secured at a different torque than the initial desired make-up torque.

In addition, some existing anti-rotation keys are designed to interface very closely with the connector assembly to fill a recess therein. As such, these keys can be difficult to position in the corresponding recess and often must be hammered into engagement with the connector assembly using a large amount of force. This hammering process takes an undesirable amount of time and energy to ensure that the keys are lodged into their respective recesses in the connector assembly. Often, the applied force causes the key to "bite" into the box connector, resulting in damage to the connector.

SUMMARY OF THE DISCLOSURE

In one embodiment, a vertical ratcheting anti-rotation device includes a ratchet mechanism pivotally coupled at a proximal end to a first tubular member in a first recessed area located on a shoulder of the first tubular member. A distal end of the ratcheting mechanism includes a first plurality of angled teeth and a spring allowing the ratcheting mechanism to pivot in a vertical direction within the first recessed area. The vertical ratcheting mechanism may also include a toothed insert mechanically coupled to a second tubular member in a second recessed area located on a shoulder of the second tubular member. The toothed insert may include a second plurality of angled teeth positioned to engage the first plurality of angled teeth of the ratcheting mechanism. The spring of the ratcheting mechanism is compressible during coupling of the first and second tubular members to allow the ratcheting mechanism to move vertically over the second plurality of angled teeth of the toothed insert. The spring is expandable during decoupling of the first and second tubular members to engage the first plurality of angled teeth of the ratcheting mechanism with the second plurality of angled teeth of the toothed insert.

In an example embodiment, a method for securely coupling tubular members includes preparing a first tubular member and a second tubular member to receive a pivoting, vertically coupled anti-rotation device. Preparing the first tubular member and the second tubular member may include forming a first recessed area within a shoulder of the first tubular member and forming a second recessed area within a shoulder of the second tubular member. The method may then include assembling the pivoting, vertically coupled anti-rotation device. Assembling the pivoting, vertical ratcheting anti-rotation device may include disposing a ratcheting mechanism to the first tubular member within the first recessed area, wherein the ratcheting mechanism is pivotally coupled at a proximal end to the first tubular member. A distal end of the ratcheting mechanism may include a first plurality of angled teeth and a spring allowing the ratcheting mechanism to pivot in a vertical direction within the first recessed area. Assembling the pivoting, vertical ratcheting anti-rotation device may also include disposing a toothed insert to the second tubular member within the second recessed area, wherein the toothed insert has a second plurality of angled teeth positioned to engage the first plurality of angled teeth of the ratcheting mechanism. The method may further include coupling the first tubular member and the second tubular member to a make-up torque, wherein during coupling of the first and second tubular members, the spring is compressible to allow the ratcheting mechanism to move vertically over the second plurality of angled teeth of the toothed insert.

Technical advantages of certain embodiments may include minimizing the damage caused to the load shoulder of the tubular members during installation and removal of the vertical ratcheting anti-rotation device. Another advantage provided by certain embodiments include achieving a high resistance to rotation by locating the vertical ratcheting anti-rotation device in the load shoulder of the tubular members. Another advantage provided by certain embodiments allows for the automatic locking of the vertical ratcheting anti-rotation device when the first and second tubular members are coupled to their make-up torque. Still another advantage provided by certain embodiments includes having the anti-rotation device pre-installed on the connectors prior to shipping the tubular members, thereby alleviating the need to drill or tap a hole in the tubular members prior to installing anti-rotation mechanism on site.

Other technical advantages will be readily apparent to one skilled in the art from FIGS. 1-5, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Certain embodiments according to the present disclosure are directed to an improved vertical or angular ratcheting anti-rotation device designed to prevent rotation of a first tubular member of a connector assembly with respect to a second tubular member of the connector assembly. A vertical anti-rotation device includes several features that facilitate easier, faster, and more accurate securing of the tubular members to prevent rotation of the threaded tubular members of the connector. For example, the vertical ratcheting anti-rotation device may include features that prevent decoupling of the threaded tubular members once the desired torque is applied to the threaded tubular members.

As explained in greater detail below, in certain embodiments a pivoting, vertical ratcheting anti-rotation device that may prevent tubular members from decoupling once brought to a make-up torque. The pivoting, vertical ratcheting anti-rotation device may comprise a ratcheting mechanism (e.g., a pawl) that engages a toothed insert (e.g., a rack). The ratcheting mechanism and toothed insert may be aligned within the shoulders of the tubular members. The proximal end of the ratcheting mechanism may be pivotally coupled to the male tubular member using a threaded bolt. The distal end of the ratcheting mechanism includes a plurality of angled teeth and a spring. The toothed insert may be mechanically coupled to the female tubular member. As the make-up torque is applied to the tubular members, the ratcheting mechanism may pass over the toothed insert on the female tubular member. By angling the leading edge of the teeth of the ratcheting mechanism, the ratcheting mechanism may ratchet in and out of the toothed insert. The spring of the ratcheting mechanism may compress as the ratcheting mechanism slides over the toothed insert and expand to force the distal end of the ratcheting mechanism—and thus the angled teeth of the ratcheting mechanism—into the toothed insert. In some embodiments, a lockdown bolt may be installed in the ratcheting mechanism to provide a mechanical lockdown feature. Once engaged, the teeth of the ratcheting mechanism and the toothed insert may prevent the tubular members from decoupling.

In some embodiments, the vertical ratcheting anti-rotation device is implemented using a multi-spring, vertical ratcheting anti-rotation device. The multi-spring, vertical ratcheting anti-rotation device may include a top ratcheting device coupled to the male tubular member using one or more springs and a bottom ratcheting device coupled to the female tubular member using or more springs. The top ratcheting device may have a plurality of angled teeth facing the bottom ratcheting device and the bottom ratcheting device may have a plurality of angled teeth facing the top ratcheting device. As the tubular members are brought to their make-up torque, the springs of the top and bottom ratcheting devices may compress allowing the teeth of the ratcheting mechanisms to slide over one another. The springs of the top and bottom ratcheting devices may compress as the ratcheting mechanisms slide over one another and expand to force the top and bottom ratcheting devices—and thus the teeth of the ratcheting mechanism—into one another. Once engaged, the teeth of the top and bottom ratcheting devices may prevent the tubular members from decoupling. FIGS. 1-5 provide additional details of a vertical ratcheting anti-rotation device according to certain embodiments.

Figure 1:
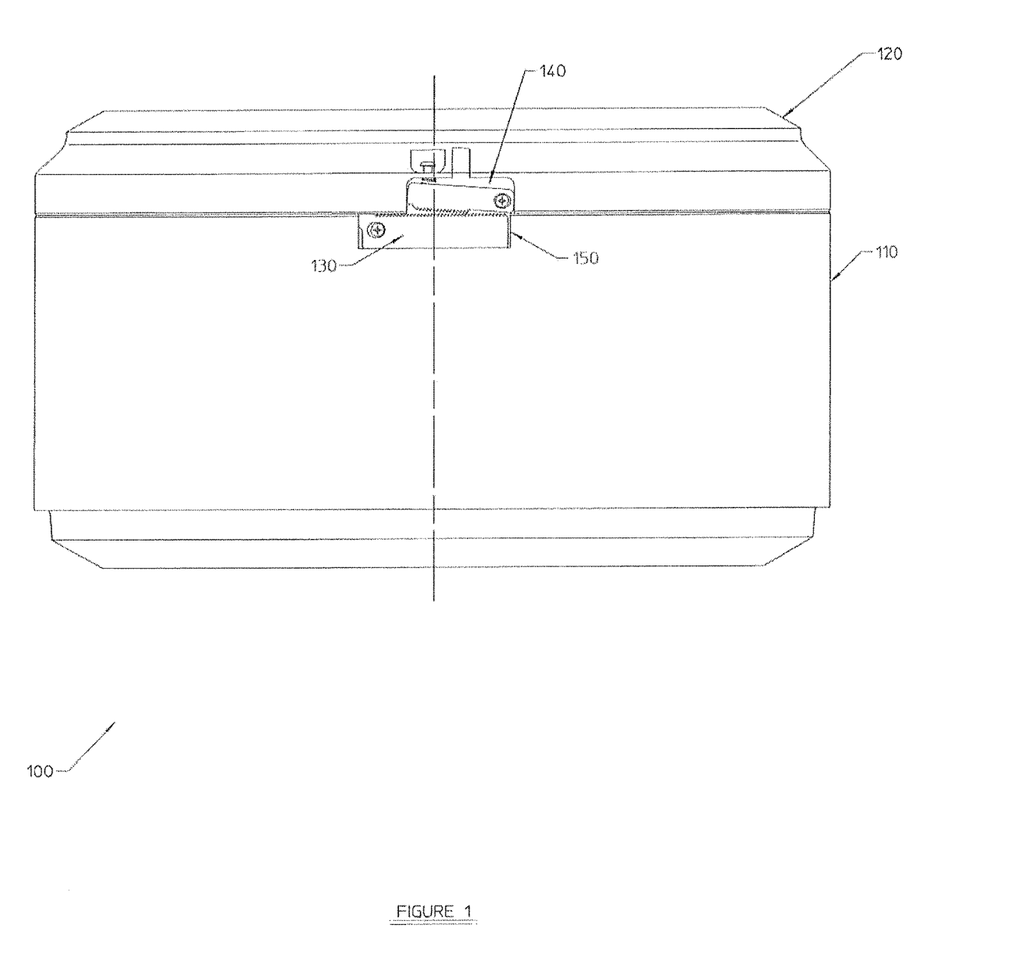
FIG. 1 illustrates a front view of a connector assembly comprising a female tubular member and a male tubular member having a vertical ratcheting anti-rotation device, in accordance with an embodiment of the present disclosure.

FIG. 1 illustrates a front view of a connector assembly 100 comprising a female tubular member 110 and a male tubular member 120 having a vertical ratcheting anti-rotation device 130 (female tubular member 110 and male tubular member 120 may collectively be referred to as "tubular members 110 and 120"). In the illustrated embodiment, the load shoulder of male tubular member 120 has a male tubular recessed area 140. Similarly, the load shoulder of female tubular member 110 has a female tubular recessed area 150 (male tubular recessed area 140 and female tubular recessed area 150 may collectively be referred to as "recessed areas 140 and 150"). As shown in greater detail in FIGS. 2 and 3 the components of vertical ratcheting anti-rotation device 130 may be located with recessed areas 140 and 150.

Female tubular member 110 may have internal threads, while male tubular member 120 may have external threads. In certain applications, female tubular member 110 may be referred to as the "box" and male tubular member 120 may be referred to as the "pin." The box and pin are designed to be coupled. These tubular members may include, for example, lengths of a wire stem or large diameter casing.

In some embodiments, the pin is foamed into the first tubular component and the box is formed into the second tubular component, such that connector assembly 100 is integral to the tubular components being connected. In other embodiments, the pin and the box may be separate components that are attached to their respective tubular components as desired to facilitate the connection. However, the present disclosure is not limited to any specific configuration of the pin and box relative to the female tubular member 110 and the male tubular member 120 being connected.

When coupling female tubular member 110 with male tubular member 120, it is desirable to rotate tubular members 110 and 120 relative to each other until tubular members 110 and 120 reach a desired make-up torque. As tubular members 110 and 120 reach this make-up torque, one or more vertical ratcheting anti-rotation devices 130 may automatically engage to prevent tubular members 110 and 120 from rotating out of their designated make-up torque.

As illustrated in FIG. 1, vertical ratcheting anti-rotation device 130 may be aligned within recessed areas 140 and 150. In some embodiments, recessed areas 140 and 150 are tangent to the side of female tubular member 110 and male tubular member 120. Vertical ratcheting anti-rotation device 130 may ensure that a secure connection is formed around the entire boundary between female tubular member 110 and male tubular member 120. Although FIG. 1 is illustrated as a single vertical anti-rotation device 130 any number of vertical ratcheting anti-rotation devices 130 may be used in connector assembly 100. For example, vertical ratcheting anti-rotation devices 130 may be installed around connector assembly 100 at certain intervals (e.g., every 45, 90, or 180 degrees).

Figure 2A:
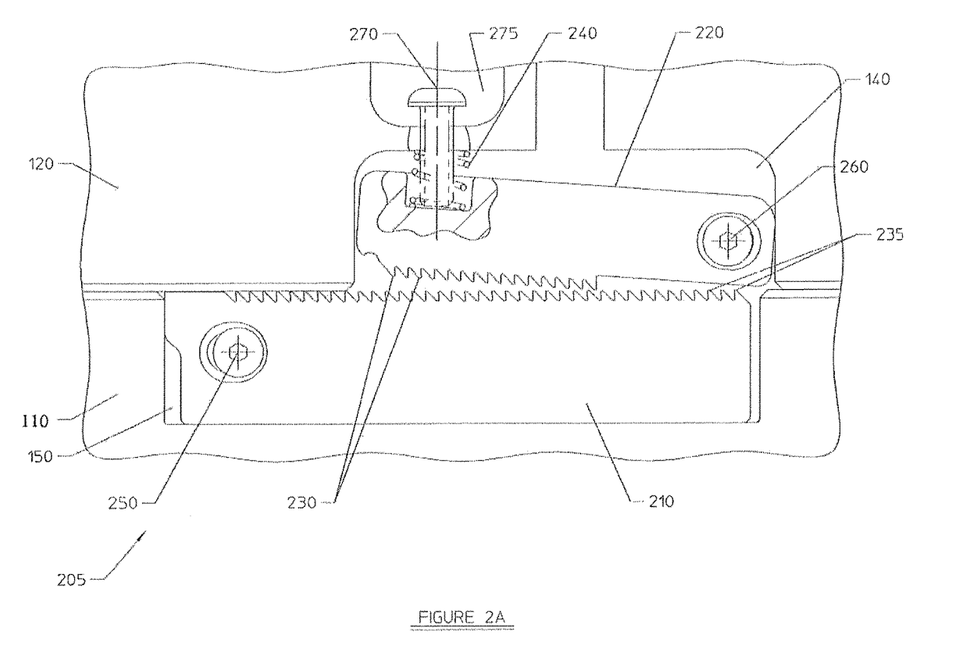
FIG. 2A illustrates a pivoting, vertical ratcheting anti-rotation device in the open position, in accordance with an embodiment of the present disclosure.
Figure 2B:
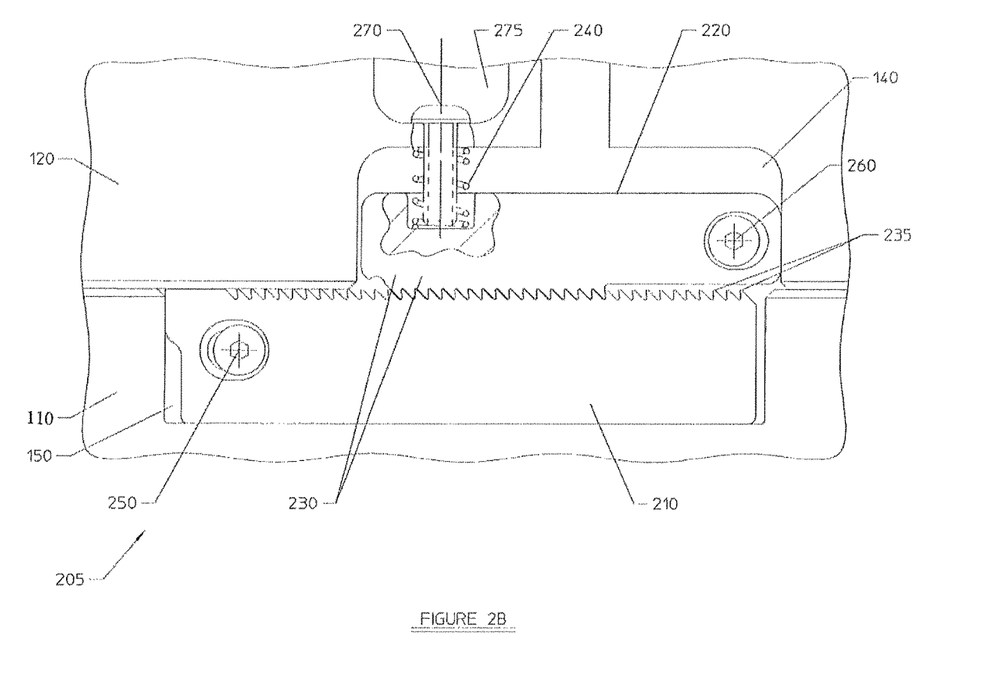
FIG. 2B illustrates the pivoting, vertical ratcheting anti-rotation device in the engaged position, in accordance with an embodiment of the present disclosure.
Figure 3A:
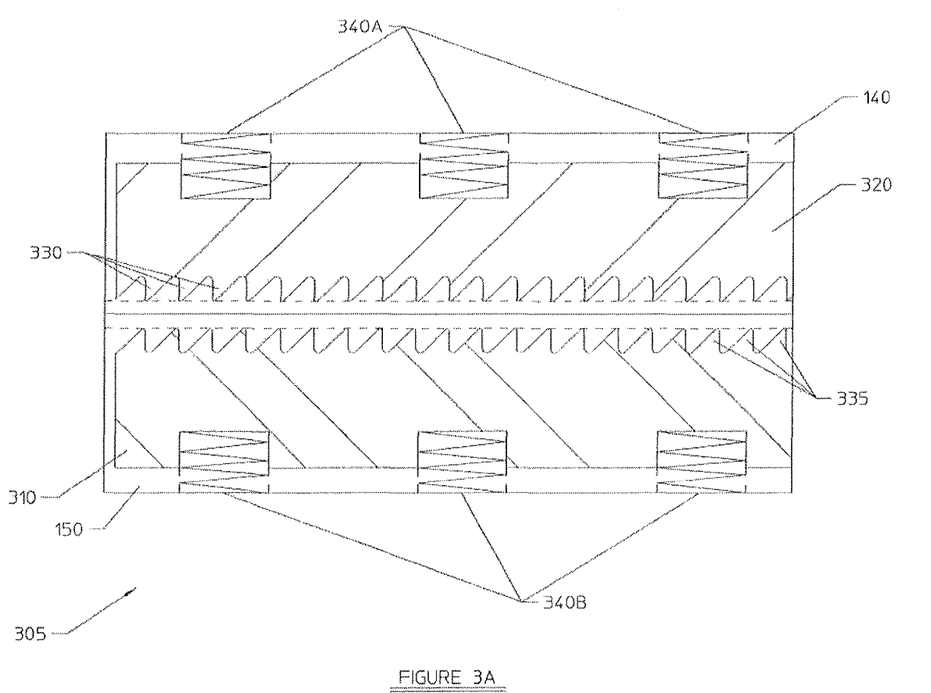
FIG. 3A illustrates a multi-spring, vertical ratcheting anti-rotation device in the open position, in accordance with an embodiment of the present disclosure.
Figure 3B:
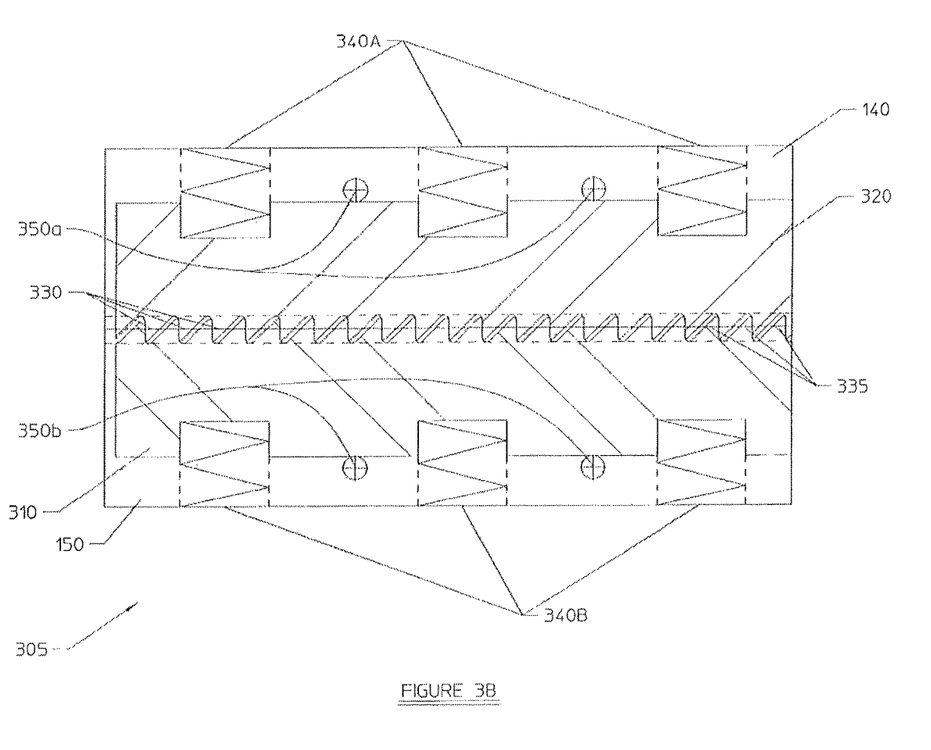
FIG. 3B illustrates the multi-spring, vertical ratcheting anti-rotation device in the engaged position, in accordance with an embodiment of the present disclosure.

In certain embodiments, recessed areas 140 and 150 may be milled into the load shoulders of female tubular member 110 and male tubular member 120 once tubular members 110 and 120 are coupled to the desired make-up torque. In some embodiments, recessed areas 140 and 150 may be milled off-site and/or included in the design of female tubular member 110 and male tubular member 120. FIGS. 2 and 3 provide a more detailed view of vertical ratcheting anti-rotation device 130, according to certain embodiments.

FIG. 2A illustrates a pivoting, vertical ratcheting anti-rotation device 205 in an open position. In the illustrated embodiment, pivoting, vertical ratcheting anti-rotation device 205 comprises toothed insert 210 within female tubular recessed area 150 and ratchet mechanism 220 located within male tubular recessed area 140.

Toothed insert 210 represents any suitable insert capable of engaging ratchet mechanism 220 to prevent decoupling of female tubular member 110 and male tubular connector 120. Toothed insert 210 may be made of any suitable material (e.g., metal, metal alloy, plastic, composite material, etc.). Moreover, toothed insert 210 may be scalable based on the size and application of tubular members 110 and 120. For example, larger diameter tubular members 110 and 120 may require a larger toothed insert 210, while smaller diameter tubular members 110 and 120 may allow for a smaller sized toothed insert 210.

Toothed insert 210 may comprise a plurality of insert teeth 235 facing upward towards ratchet mechanism 220. Toothed insert 210 may have any suitable number of insert teeth 235. In the illustrated embodiment, the plurality of insert teeth 235 run the entire length of toothed insert 210. Toothed insert 210 may also utilize any suitable pattern for the plurality of insert teeth 235 to distribute the force created when female tubular member 110 and male tubular member 120 attempt to decouple.

In the illustrated embodiment, toothed insert 210 is mechanically coupled to female tubular recessed area 150 of female tubular member 110 using insert threaded bolt 250. In some embodiments, toothed insert 210 is installed tangent to the side of female tubular member 110 within female tubular recessed area 150. In this manner, toothed insert 210 may be replaceable in the event toothed insert 210 is damaged. For example, if one or more insert teeth 235 become damaged or broken, toothed insert 210 may be replaced by removing insert threaded bolt 250 and installing a new toothed insert 210.

Ratchet mechanism 220 represents any suitable mechanism capable of pivoting within male tubular recessed area 140 to engage toothed insert 210. Male tubular recessed area 140 may be sized to leave a gap between ratchet mechanism 220 and the inside wall of male tubular recessed area 140 to allow ratchet mechanism 220 to move in the vertical direction as female tubular member 110 and male tubular member 120 are coupled. In the illustrated embodiment, ratchet mechanism 220 comprises ratchet teeth 230 and spring 240. In the illustrated embodiment, ratchet teeth 230 face downward towards toothed insert 210 while spring 240 is positioned to engage the top wall of male tubular recess member 140. Ratchet mechanism 220 may be made of any suitable material (e.g., metal, metal alloy, plastic, composite material, etc.). Similar to toothed insert 210, ratchet mechanism 220 may be scalable based on the size and application of tubular members 110 and 120.

A proximal end of ratchet mechanism 220 may be mechanically coupled to male tubular recessed area 140 using ratchet threaded bolt 260. In some embodiments, toothed insert 210 is installed tangent to the side of female tubular member 110 within female tubular recessed area 150. Ratchet threaded bolt 260 may act as a pivot point for ratchet mechanism 220, thereby allowing ratchet mechanism 220 to rotate a sufficient distance to allow ratchet teeth 230 to move in and out of insert teeth 235 when tubular members 110 and 120 are being coupled. Accordingly, in some embodiments, the gap between the wall of male tubular recessed area 140 and ratchet mechanism 220 may be determined by the length of ratcheting teeth 230 and insert teeth 235.

To facilitate the pivoting ratcheting effect, in some embodiments, ratchet mechanism 220 may have fewer ratchet teeth 230 than insert teeth 235 of toothed insert 210. This may allow ratchet mechanism 220 to pivot about ratchet threaded bolt 260 and move in the vertical direction as ratchet mechanism 220 moves over toothed insert 210.

Spring 240 represents any suitable device operable to exert force on ratchet mechanism 220 to driving ratchet teeth 230 into insert teeth 235. In the illustrated embodiment, spring 240 is mechanically coupled to a distal end of ratchet mechanism 220. Although spring 240 is illustrated as being coupled to ratchet mechanism 220, in some embodiments spring 240 is coupled to the wall of male tubular recessed area 140. Spring 240 may be any suitable springing device, including but not limited to a compression spring and a torsion spring.

The free length (i.e., the uncompressed length) of spring 240 may depend on a number of factors including the size of male tubular recessed area 140 and ratchet mechanism 220. Furthermore, the spring constant or spring rate of spring 240 may depend on factors such as the force needed keep ratchet teeth 230 engaged with insert teeth 235 and overcome decoupling forces created by female tubular member 110 and male tubular member 120.

In some embodiments, vertical ratcheting, anti-rotation device may include a locking bolt 270 coupled to the distal end of ratchet mechanism 220. Locking bolt 270 may comprise any suitable device operable to engage ratchet mechanism 220 in a downward, engaged position with toothed insert 210. In some embodiments, locking bolt 270 may be a socket button head cap screw. Locking bolt 270 may be installed in male tubular recessed area 140. In some embodiments, locking bolt 270 may be installed in a locking bolt recessed area 275 separate from male tubular recess member 140. In the illustrated embodiment, locking bolt 270 is within spring 240. In some embodiments, locking bolt 270 may be located at other locations, external to spring 240.

As shown in FIG. 2A, spring 240 will compress against the top wall of male tubular recess area 140 as tubular members 110 and 120 are brought to their make-up torque. While tubular members 110 and 120 are coupling, ratchet teeth 230 of ratchet mechanism 220 will slide over insert teeth 235 of toothed insert 210 causing spring 240 to compress against the wall of male tubular recess area 140. By angling the leading edge of ratchet teeth 230, pivoting, vertical ratcheting anti-rotation device 205 may provide little resistance as tubular members 110 and 120 are brought to their make-up torque.

FIG. 2B illustrates the pivoting, vertical ratcheting anti-rotation device 205 in an engaged position. As shown in the illustrated embodiment, once ratchet teeth 230 slide over insert teeth 235, spring 240 will expand to force ratchet teeth 230 into the recesses of insert teeth 235. In the engaged position, ratchet teeth 230 and insert teeth 235 make contact to prevent female tubular member 110 from decoupling with male tubular member 120 while still allowing tubular members 110 and 120 to further rotate to a make-up torque.

In some embodiments, once female tubular member 110 and male tubular member 120 reach their make-up torque and ratchet mechanism 220 is engaged with toothed insert 210, locking bolt 270 may be installed in male tubular recessed area 140. Locking bolt 270 may retain ratchet mechanism 220 in the downward, engaged position with toothed insert 210. In some embodiments, locking bolt 270 acts to relieve stress on spring 240. Although FIG. 2B shows a single locking bolt 270, any suitable number of locking bolts may be used in pivoting, vertical ratcheting anti-rotation device 205.

In some embodiments, female tubular member 110 and male tubular member 120 may need to be decoupled after they have been brought to their make-up torque. To decouple female tubular member 110 and male tubular member 120, ratchet threaded bolt 260 and locking bolt 270 may be removed. Once ratchet threaded bolt 260 and locking bolt 270 are removed, ratchet mechanism 220 may be removed from male tubular recessed area 140 and tubular members 110 and 120 may be decoupled. In this manner, the removal/disengagement of pivoting, vertical ratcheting anti-rotation device 205 with minimal damage to tubular members 110 and 120.

Modifications, additions, or omissions may be made to the pivoting, vertical ratcheting anti-rotation device without departing from the scope of the disclosure. In some embodiments, toothed insert 210 and ratchet mechanism 220 may be pre-installed in female tubular member 110 and male tubular member 120, respectively. Although pivoting, vertical ratcheting device is illustrated as using spring 240 to engage ratchet teeth 230 with insert teeth 235 other mechanisms may be used to allow the ratcheting mechanism. In other embodiments, the pin and the box sections of connector assembly 100 may be reversed, such that the box acts as the male tubular member 120 and the pin acts as the female tubular member 110. Moreover, although toothed insert 210 and ratchet mechanism 220 are illustrated as being assembled within recessed areas 140 and 150, in some embodiments, toothed insert 210 and ratchet mechanism 220 may be assembled on the exterior of female tubular member 110 and male tubular member 120. Furthermore, in some embodiments ratchet teeth 230 and insert teeth 235 may both have angled teeth with angled leading and lagging edges.

FIG. 3A illustrates a multi-spring, vertical ratcheting anti-rotation device 305 in an open position. Multi-spring, vertical ratcheting anti-rotation device 305 may comprise bottom ratcheting device 310 within female tubular recessed area 150 and top ratcheting device 320 within male tubular recessed area 140 (bottom ratcheting device 310 and top ratcheting device 320 may collectively be referred to as "ratcheting devices 310 and 320"). In contrast to ratchet mechanism 220, which pivots about ratchet threaded bolt 260 at a proximal end, the entire lengths of ratcheting devices 310 and 320 may extend and compress vertically.

In the illustrated embodiment, bottom ratcheting device 310 is mechanically coupled to female tubular recessed area 150 using a plurality of bottom springs 340b. In some embodiments, bottom ratcheting device 310 is installed tangent to the side of female tubular member 110. In this manner, bottom ratcheting device 310 may be replaceable in the event bottom ratcheting device 310 is damaged.

Bottom ratcheting device 310 may comprise a plurality of bottom teeth 335 facing upward towards top ratcheting device 320. Bottom ratcheting device 310 may have any suitable number of bottom teeth 335. In the illustrated embodiment, the plurality of bottom teeth 335 run the entire length of bottom ratcheting device 310. Bottom ratcheting device 310 may also utilize any suitable pattern for the plurality of bottom teeth 335 to distribute the force created when female tubular member 110 and male tubular member 120 attempt to decouple.

In the illustrated embodiment, top ratcheting device 320 is mechanically coupled to male tubular recessed area 140 using a plurality of top springs 340a. In some embodiments, top ratcheting device 320 is installed tangent to the side of male tubular member 120 within male tubular recessed area 140. In this manner, top ratcheting device 320 may be replaceable in the event top ratcheting device 320 is damaged.

Top ratcheting device 320 may comprise a plurality of top teeth 330 facing downward towards bottom ratcheting device 310. Top ratcheting device 320 may have any suitable number of top teeth 330. In the illustrated embodiment, the plurality of top teeth 330 run the entire length of top ratcheting device 320. Top ratcheting device 320 may also utilize any suitable pattern for the plurality of top teeth 330 to distribute the force created when female tubular member 110 and male tubular member 120 attempt to decouple. In some embodiments, top teeth 330 and bottom teeth 335 may have matching teeth patterns.

Ratcheting devices 310 and 320, may be made of any suitable material (e.g., metal, metal alloy, plastic, composite material, etc.). Moreover, ratcheting devices 310 and 320 may be scalable based on the size and application of tubular members 110 and 120. For example, larger diameter tubular members 110 and 120 may require larger ratcheting devices 310 and 320, while smaller diameter tubular members 110 and 120 may allow for smaller sized ratcheting devices 310 and 320.

Top springs 340a and bottom springs 340b (collective "springs 340") represent any suitable device operable to exert force on bottom ratcheting device 310 and top ratcheting device 320 to drive top teeth 330 and bottom teeth 335 into one another. In the illustrated embodiment, top springs 340a are mechanically coupled to top ratcheting device 320. Similarly, bottom springs 340b are mechanically coupled to bottom ratcheting device 310. Although the illustrated embodiment show three top springs 340a and three bottom springs 340b, any suitable number of springs may be used in multi-spring, vertical ratcheting anti-rotation device 305. Moreover, although springs 340 are illustrated as being coupled to bottom ratcheting device 310 and top ratcheting device 320, in some embodiments, springs 340 are coupled to the wall of male tubular recessed area 140. Springs 340 may be any suitable springing device, including but not limited to a compression spring and a torsion spring.

The free length (i.e., the uncompressed length) of springs 340 may depend on a number of factors including the size of male tubular recessed area 140 and ratcheting devices 310 and 320. Furthermore, the spring constant or spring rate of springs 340 may depend on factors such as the force needed keep top teeth 330 engaged with bottom teeth 335 to overcome decoupling forces created by female tubular member 110 and male tubular member 120.

As shown in FIG. 3A, springs 340 will compress as multi-spring, vertical ratcheting anti-rotation device 305 moves to an open position when top teeth 330 slide over bottom teeth 335. As tubular members 110 and 120 are brought to their make-up torque, top teeth 330 of top ratcheting device 320 and bottom teeth 335 of bottom ratcheting device 310 will slide over each other. As top teeth 330 slide over bottom teeth 335, top springs 340a and bottom springs 340b may compress against the wall of male tubular recessed area 140 and female tubular recess area 150, respectively. By angling the leading edge of top teeth 330 and/or bottom teeth 335, female tubular member 110 and male tubular member 120 may be torqued to the desired level with minimal resistance created by multi-spring, vertical ratcheting anti-rotation device 305.

FIG. 3B illustrates the multi-spring, vertical ratcheting anti-rotation device 305 in the engaged position. As shown in the illustrated embodiment, once top teeth 330 slide over bottom teeth 335, springs 340 will expand to force top teeth 330 and bottom teeth 335 into one another. In the engaged position, top teeth 330 and bottom teeth 335 make contact to prevent female tubular member 110 from decoupling with male tubular member 120 while still allowing tubular members 110 and 120 to further couple to a make-up torque.

In some embodiments, once female tubular member 110 and male tubular member 120 reach their make-up torque and top ratcheting device 320 is engaged with bottom ratchet device 310, a plurality of top locking bolts 350a and bottom locking bolts 350b may be installed in male tubular recessed area 140 and female tubular recessed area 150, respectively. Top locking bolts 350a may retain top ratcheting device 320 in the downward position while bottom locking bolts 350b may retain bottom ratcheting device 310 in the upward position, thereby securing ratcheting devices 310 and 320 in an engaged position. In some embodiments, top locking bolts 350a and bottom locking bolts 350b act to relieve stress on springs 340. Although FIG. 2B shows two top locking bolts 350a and two bottom locking bolts 350b, any suitable number of locking bolts 350 may be used in multi-spring, vertical ratcheting anti-rotation device 305.

In some embodiments, female tubular member 110 and male tubular member 120 may need to be decoupled after they have been brought to their make-up torque. To decouple female tubular member 110 and male tubular member 120, In this manner, the removal/disengagement of pivoting, multi-spring, vertical ratcheting anti-rotation device 305 with little damage to tubular members 110 and 120.

Modifications, additions, or omissions may be made to the multi-spring, vertical ratcheting anti-rotation device without departing from the scope of the disclosure. For example, in some embodiments, multi-spring, vertical ratcheting anti-rotation device 305 may comprise top ratcheting device 320 with toothed insert 210 instead of bottom ratcheting device 310.

Figure 4A:
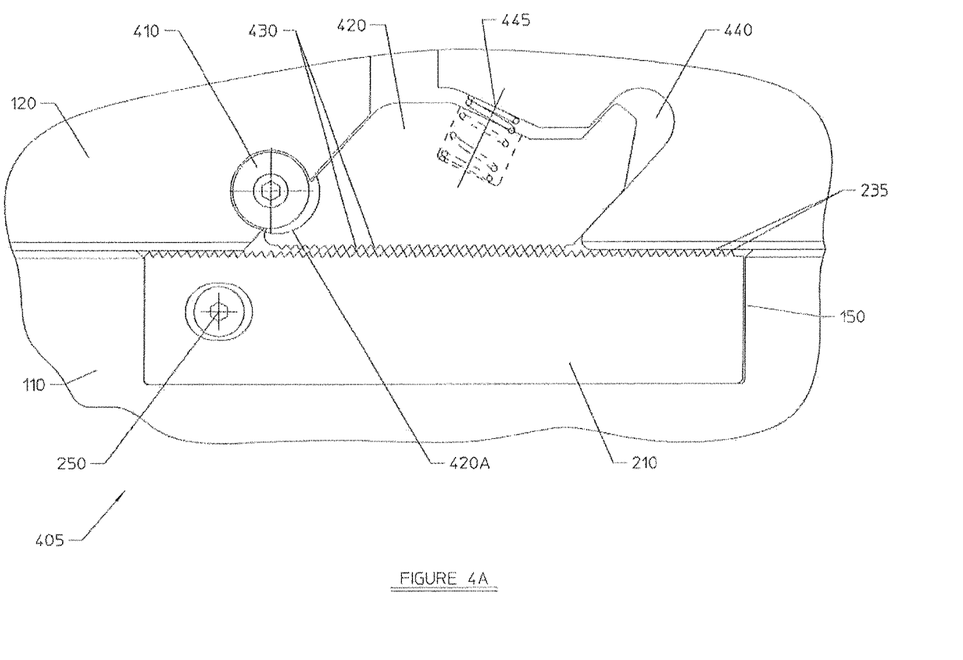
FIG. 4A illustrates an angularly pivoting, anti-rotation device in the open position, in accordance with an embodiment of the present disclosure.

FIG. 4A illustrates an angularly pivoting, anti-rotation device 405 in the open position. Angularly pivoting, anti-rotation device 405 may comprise toothed insert 210 within female tubular recessed area 150 and angular pivoting mechanism 420 within angular male tubular recessed area 440. Angular pivoting mechanism 420 may ratchet, pivot, or translate in an angular direction within angular male tubular recessed area 440.

Similar to vertical ratcheting anti-rotation device 205, in the illustrated embodiment toothed insert 210 may be mechanically coupled to female tubular recessed area 150 of female tubular member 110 using insert threaded bolt 250. In this manner, the same toothed insert 210 may be used with different ratcheting mechanisms and anti-rotation setups such as ratchet mechanism 220, top ratcheting device 320, and/or angular pivoting mechanism 420. While the illustrated embodiment shows toothed insert 210 having the same shape and tooth profile as toothed insert 210 of FIGS. 2A and 2B, in some embodiments a different design or tooth profile may be used instead.

Angular pivoting mechanism 420 represents any suitable mechanism capable of angularly pivoting, sliding, or ratcheting within angular male tubular recessed area 440 to engage toothed insert 210. Angular male tubular recessed area 440 may be sized to leave a gap between angular pivoting mechanism 420 and the inside wall of angular male tubular recessed area 440 to allow angular ratchet mechanism 420 to move in an angular direction as female tubular member 110 and male tubular member 120 are coupled.

In the illustrated embodiment, angular pivoting mechanism 420 comprises angular ratchet teeth 430 and angular spring 445. Angular ratchet teeth 430 face downward towards toothed insert 210 while angular spring 445 is positioned to engage the top angular wall of angular male tubular recessed area 440. Angular pivoting mechanism 420 may be made of any suitable material (e.g., metal, metal alloy, plastic, composite material, etc.). Similar to ratchet mechanism 220, angular pivoting mechanism 420 may be scalable based on the size and application of tubular members 110 and 120.

As also shown in the illustrated embodiment, angular pivoting mechanism may have a recessed pocket 420A. In some embodiments, a retaining bolt 410 retains angular pivoting mechanism 420 within angular male tubular recessed area 440 using recessed pocket 420A. Retaining bolt 410 may be installed into recessed pocket 420A to prevent radial movement of angular pivoting mechanism 420. Thus, recessed pocket 420A and retaining bolt 410 may work to alleviate or prevent radial loading of angular pivoting mechanism 420. Retaining bolt 410 may be made of any suitable material and may be any suitable size. In some embodiments, retaining bolt 410 may be similar to ratchet threaded bolt 260 in size, shape, and/or material.

To facilitate the pivoting ratcheting effect, in some embodiments, angular pivoting mechanism 420 may have fewer angular ratchet teeth 430 than insert teeth 235 of toothed insert 210. This may allow angular ratchet mechanism 420 to move in an angular direction as angular ratchet mechanism 420 moves over toothed insert 210.

Angular spring 445 represents any suitable device operable to exert force on angular pivoting mechanism 420 to drive angular ratchet teeth 430 into insert teeth 235. In the illustrated embodiment, angular spring 445 is mechanically coupled to angular pivoting mechanism 420. Although angular spring 445 is illustrated as being coupled to angular pivoting mechanism 420, in some embodiments angular spring 445 is coupled to the angled wall of angular male tubular recessed area 440. Angular spring 445 may be any suitable springing device, including but not limited to a compression spring and a torsion spring.

The free length (i.e., the uncompressed length) of angular spring 445 may depend on a number of factors including the size of angular male tubular recessed area 440 and angular pivoting mechanism 420. Furthermore, the spring constant or spring rate of angular spring 445 may depend on factors such as the force needed keep angular ratchet teeth 430 engaged with insert teeth 235 and overcome decoupling forces created by female tubular member 110 and male tubular member 120.

As shown in FIG. 4A, angular spring 445 will compress against the angled wall of angular male tubular recess area 440 as tubular members 110 and 120 are brought to their make-up torque. While tubular members 110 and 120 are coupling, angular ratchet teeth 430 of angular pivoting mechanism 420 will slide over insert teeth 235 of toothed insert 210 causing angular spring 445 to compress against the wall of angular male tubular recess area 440. By angling the leading edge of angular ratchet teeth 430, angularly pivoting, anti-rotation device 405 may provide little resistance as tubular members 110 and 120 are brought to their make-up torque.

Figure 4B:
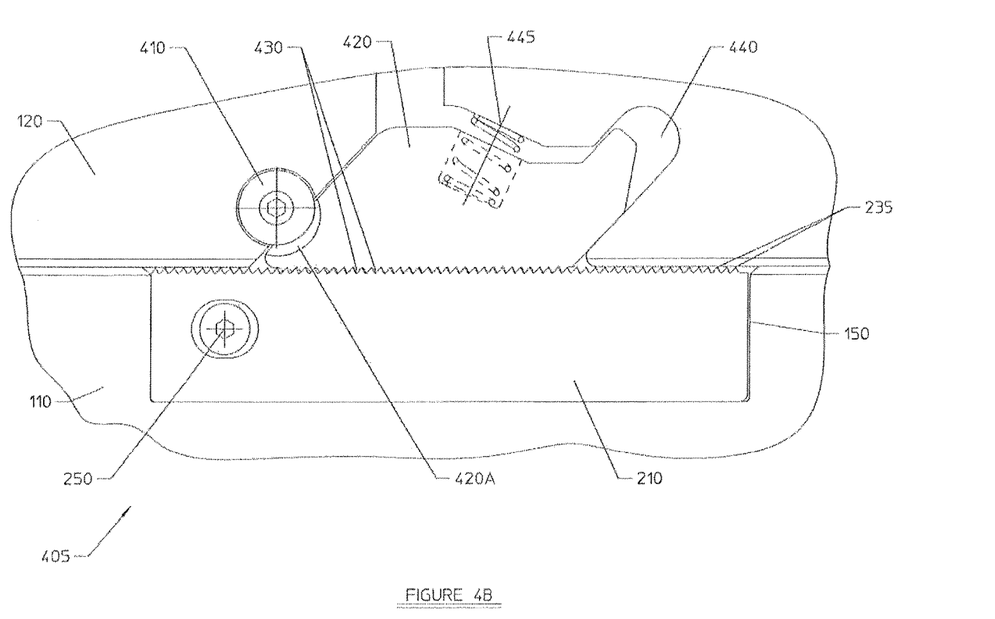
FIG. 4B illustrates the angularly pivoting, anti-rotation device in the engaged position, in accordance with an embodiment of the present disclosure.

FIG. 4B illustrates the angularly pivoting, anti-rotation device 405 in an engaged position. As shown in the illustrated embodiment, once angular ratchet teeth 430 slide over insert teeth 235, angular spring 445 will expand to force angular ratchet teeth 430 into the recesses of insert teeth 235. In the engaged position, angular ratchet teeth 430 and insert teeth 235 make contact to prevent female tubular member 110 from decoupling with male tubular member 120 while still allowing tubular members 110 and 120 to further rotate to a make-up torque.

In some embodiments, female tubular member 110 and male tubular member 120 may need to be decoupled after they have been brought to their make-up torque. To decouple female tubular member 110 and male tubular member 120, ratchet threaded bolt 260 may be removed. Once ratchet threaded bolt 260 is removed, angular pivoting mechanism 420 may be removed from angular male tubular recessed area 440 and tubular members 110 and 120 may be decoupled. In this manner, the removal/disengagement of angularly pivoting, anti-rotation device 405 with minimal damage to tubular members 110 and 120.

Modifications, additions, or omissions may be made to the angularly pivoting, anti-rotation device 405 without departing from the scope of the disclosure. For example, although not illustrated, angularly pivoting, anti-rotation device 405 may include a locking bolt similar to locking bolt 270 used to retain ratchet mechanism 220 in the downward, engaged position with toothed insert 210.

Moreover, in addition to or alternative to retaining bolt 410, in some embodiments a proximal end of angular pivoting mechanism 420 may be mechanically coupled to angular male tubular recessed area 440 using a threaded bolt similar to ratchet threaded bolt 260. The threaded bolt may act as a pivot or sliding point for angular pivoting mechanism 420, thereby allowing angular pivoting mechanism 420 to rotate or slide to allow angular ratchet teeth 430 to move in and out of insert teeth 235 when tubular members 110 and 120 are being coupled. Accordingly, in some embodiments, the gap between the angled wall of angular male tubular recessed area 440 and angular pivoting mechanism 420 may be determined by the length of angular ratchet teeth 430 and insert teeth 235. Furthermore, in some embodiments, toothed insert 210 and angular pivoting mechanism 420 may be pre-installed in female tubular member 110 and male tubular member 120, respectively. Moreover, in some embodiments angular ratchet teeth 430 and insert teeth 235 may both have angled teeth with angled leading and lagging edges.

Although angularly pivoting, anti-rotation device 405 is illustrated as using angular spring 445 to engage angular ratchet teeth 430 with insert teeth 235 other mechanisms may be used to allow the pivoting mechanism. In other embodiments, the pin and the box sections of connector assembly 100 may be reversed, such that the box acts as the male tubular member 120 and the pin acts as the female tubular member 110. Moreover, although toothed insert 210 and angular pivoting mechanism 420 are illustrated as being assembled within recessed areas 440 and 150, in some embodiments, toothed insert 210 and angular pivoting mechanism 420 may be assembled on the exterior of female tubular member 110 and male tubular member 120.

Figure 5:
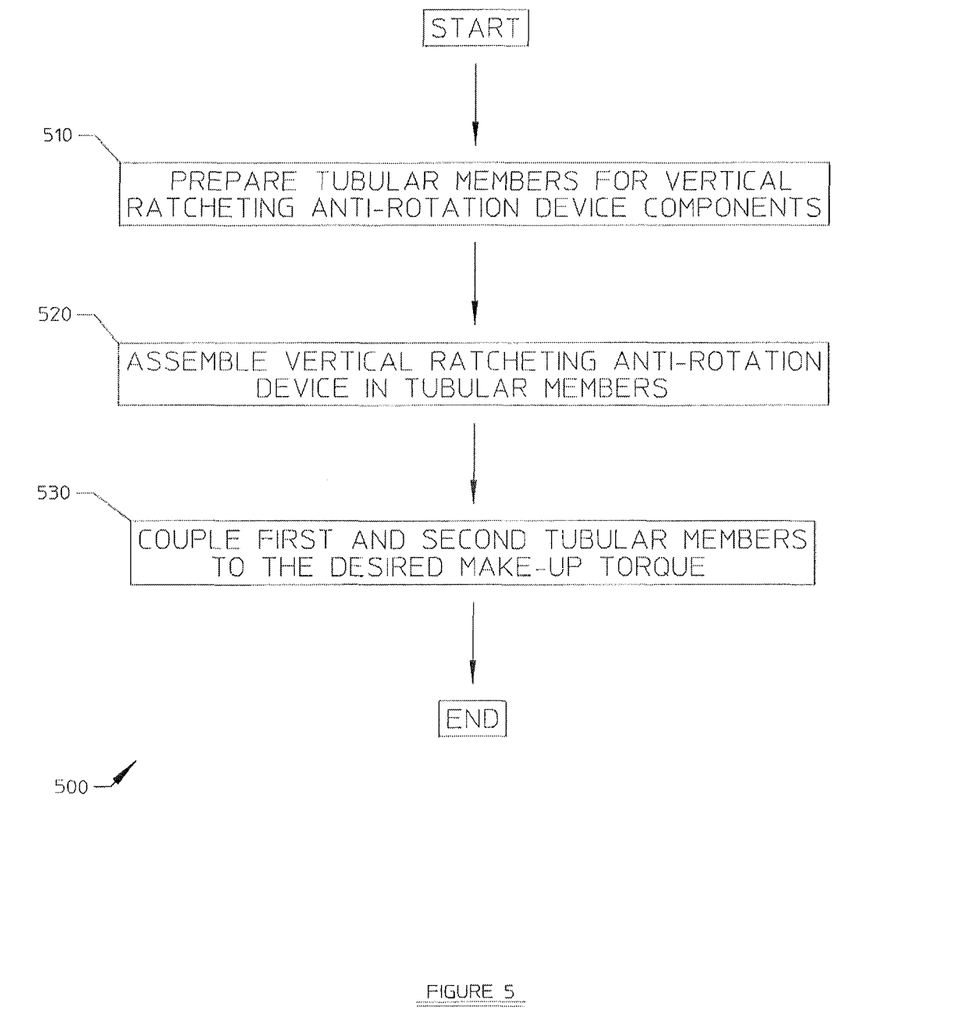
FIG. 5 illustrates a method for securely coupling tubular members using a vertical ratcheting anti-rotation device, in accordance with an embodiment of the present disclosure.

FIG. 5 illustrates a method 500 for securely coupling tubular members 110 and 120 using a vertical ratcheting anti-rotation device 130. At step 510, female tubular member 110 and male tubular member 120 are prepared for the vertical ratcheting anti-rotation device 130 components. Preparation of tubular members 110 and 120 may including forming male tubular recessed area 140 into the load shoulder of male tubular member 120 and forming female tubular recessed area 150 into the load shoulder of female tubular member 110. For example, in certain embodiments, forming recessed areas 140 and 150 may be completed by milling recessed areas 140 and 150.

At step 520, vertical ratcheting anti-rotation device 130 may be assembled in tubular members 110 and 120. For example, to assemble pivoting, vertical ratcheting anti-rotation device 205, ratchet mechanism 220 may be disposed within male tubular recessed area 140 and toothed insert 210 may be disposed within female tubular recessed area 150. In some embodiments, ratchet mechanism 220 may be pivotally coupled at a proximal end to male tubular member 120 using ratchet threaded bolt 260, while toothed insert 210 is mechanically coupled to female tubular recessed area 150 using insert threaded bolt 250.

As another example, to assemble multi-spring, vertical ratcheting anti-rotation device 305, top ratcheting device 320 may be disposed within male tubular recessed area 140 and bottom ratcheting device 310 may be disposed within female tubular recessed area 150. In some embodiments, top ratcheting device 320 is coupled to male tubular recessed area 140 using top springs 340*a* while bottom ratcheting device 310 is coupled to female tubular recessed area 150 using bottom springs 340*b*.

As another example, to assemble angularly pivoting, anti-rotation device 405, angular pivoting mechanism 420 may be disposed within angular male tubular recessed area 440 and toothed insert 210 may be disposed within female tubular recessed area 150. In some embodiments, angular pivoting mechanism 420 may be pivotally coupled at a proximal end to male tubular member 120 using ratchet threaded bolt 260, while toothed insert 210 is mechanically coupled to female tubular recessed area 150 using insert threaded bolt 250.

At step 530, the female tubular member 110 and male tubular member 120 may be coupled to a desired make-up torque. The desired make-up torque of tubular members 110 and 120 may depend on a number of factors including the application of tubular members 110 and 120, the material used to create the tubular members 110 and 120, and the design of tubular members 110 and 120.

As tubular members 110 and 120 are being coupled to the desired make-up torque, vertical ratcheting anti-rotation device may automatically engage to prevent female tubular member 110 and male tubular member 120 from decoupling.

For example, spring 240 may compress as pivoting, vertical ratcheting anti-rotation device 205 moves to an open position when ratchet teeth 230 slide over insert teeth 235. As tubular members 110 and 120 are brought to their make-up torque, ratchet teeth 230 of ratchet mechanism 220 will slide over insert teeth 235 of toothed insert 210. As ratchet teeth 230 slide over insert teeth 235, spring 240 may compress against the wall of male tubular recess area 140. Once ratchet teeth 230 slide over insert teeth 235, spring 240 will expand and force ratchet teeth 230 into the recesses of insert teeth 235. In the engaged position, ratchet teeth 230 and insert teeth 235 make contact to prevent female tubular member 110 from decoupling with male tubular member 120 while still allowing tubular members 110 and 120 to further couple to a make-up torque. Accordingly, pivoting, vertical ratcheting anti-rotation device 205 may automatically resist decoupling of tubular members 110 and 120.

As another example, top springs 304a and bottom springs 340b will compress as multi-spring, vertical ratcheting anti-rotation device 305 moves to an open position when top teeth 330 slide over bottom teeth 335. As tubular members 110 and 120 are brought to their make-up torque, top teeth 330 of top ratcheting device 320 and bottom teeth 335 of bottom ratcheting device 310 will slide over each other. As top teeth 330 slide over bottom teeth 335, top springs 340a and bottom springs 340b may compress against the wall of male tubular recess area 140 and female tubular recess area 150, respectively. Once top teeth 330 slide over bottom teeth 335, springs 340 will expand and drive top teeth 330 and bottom teeth 335 into each other. In the engaged position, top teeth 330 and bottom teeth 335 make contact to prevent female tubular member 110 from decoupling with male tubular member 120 while still allowing tubular members 110 and 120 to further couple to a make-up torque. Accordingly, multi-spring, vertical ratcheting anti-rotation device 305 may automatically resist decoupling of tubular members 110 and 120.

As another example, angular spring 445 may compress as angular pivoting, anti-rotation device 405 moves to an open position when angular ratchet teeth 430 slide over insert teeth 235. As tubular members 110 and 120 are brought to their make-up torque, angular ratchet teeth 430 of angular pivoting mechanism 420 will slide over insert teeth 235 of toothed insert 210. As angular ratchet teeth 430 slide over insert teeth 235, angular spring 445 may compress against the angled wall of angular male tubular recess area 440. Once angular ratchet teeth 430 slide over insert teeth 235, angular spring 445 will expand and force angular ratchet teeth 430 into the recesses of insert teeth 235. In the engaged position, angular ratchet teeth 430 and insert teeth 235 make contact to prevent female tubular member 110 from decoupling with male tubular member 120 while still allowing tubular members 110 and 120 to further couple to a make-up torque. Accordingly, angular pivoting, anti-rotation device 405 may automatically resist decoupling of tubular members 110 and 120.

Various embodiments may perform some, all, or none of the steps described above. For example, in certain embodiments, tubular members may be prepared off-site so that the tubular members do not need to be prepared on location. Moreover, one or more steps may be repeated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure. Embodiments of the present disclosure are best understood by referring to FIGS. 1 through 4, where like numbers are used to indicate like and corresponding parts.

What is claimed is:

1. A system, comprising:
  a first tubular member having a first recessed area, the first recessed area located on a first shoulder of the first tubular member;
  a second tubular member having a second recessed area, the second recessed area located on a second shoulder of the second tubular member;
  a ratchet mechanism pivotally coupled to the first tubular member within the first recessed area at a proximal end of the ratchet mechanism, wherein a distal end of the ratchet mechanism comprises a first plurality of angled teeth and a spring allowing the ratchet mechanism to pivot in a vertical direction within the first recessed area;
  a toothed insert mechanically coupled to the second tubular member within the second recessed area, wherein the toothed insert comprises a second plurality of angled teeth positioned to engage the first plurality of angled teeth of the ratchet mechanism;
  wherein during coupling of the first and second tubular members, the spring is compressible to allow the ratchet mechanism to move vertically over the second plurality of angled teeth of the toothed insert; and
  wherein decoupling of the first and second tubular members is prevented by engagement of the first plurality of angled teeth of the ratchet mechanism with the second plurality of angled teeth of the toothed insert, which is initiated by the expansion of the spring.

2. The system of claim 1, further comprising a locking bolt mechanically coupled at the distal end of the ratchet mechanism, wherein when the first and second tubular members are coupled, the locking bolt is installable, retaining the first plurality of angled teeth of the ratchet mechanism with the second plurality of angled teeth of the toothed insert.

3. The system of claim 1, wherein the ratchet mechanism is pivotally coupled to the first threaded insert using a threaded bolt such that the ratchet mechanism is removable upon removal of the threaded bolt.

4. The system of claim 1, further comprising a threaded hole within the first recessed area, wherein the threaded hole is configured to receive a threaded bolt to prevent the first plurality of angled teeth of the ratchet mechanism from vertically disengaging from the second plurality of angled teeth of the toothed insert.

5. The system of claim 1, wherein the ratchet mechanism is pivotally coupled to the first threaded tubular member using a threaded bolt such that when the first plurality of angled teeth of the ratchet mechanism are engaged with the second plurality of angled teeth of the toothed insert the ratchet mechanism is removable upon removal of the threaded bolt.

6. The system of claim 1, wherein the first threaded tubular member is a male pin connector and the second threaded tubular member is a female box connector.

7. The system of claim 1, wherein the first and second plurality of angled teeth comprise an angled leading edge and a flat lagging edge.

8. A method for securely coupling tubular members, the method comprising:
  preparing a first tubular member and a second tubular member to receive a pivoting, vertical ratcheting anti-rotation device, wherein preparing the first tubular member and the second tubular member comprises:
    forming a first recessed area within a shoulder of the first tubular member; and
    forming a second recessed area within a shoulder of the second tubular member;
  assembling the pivoting, vertical ratcheting anti-rotation device, wherein assembling the pivoting, vertical ratcheting anti-rotation device comprises:
    disposing a ratchet mechanism to the first tubular member within the first recessed area, wherein the ratchet mechanism is pivotally coupled at a proximal end to the first tubular member, a distal end of the ratchet mechanism comprising a first plurality of angled teeth and a spring allowing the ratchet mechanism to pivot in a vertical direction within the first recessed area;
    disposing a toothed insert to the second tubular member within the second recessed area, wherein the toothed insert comprises a second plurality of angled teeth positioned to engage the first plurality of angled teeth of the ratchet mechanism; and
  coupling the first tubular member and the second tubular member, wherein during coupling of the first and second tubular members, the spring is compressible to allow the ratchet mechanism to move vertically over the second plurality of angled teeth of the toothed insert.

9. The method of claim 8, further comprising:
  installing a locking bolt at the distal end of the ratchet mechanism when the first and second tubular members are coupled, wherein the locking bolt retains the first plurality of angled teeth of the ratchet mechanism with the second plurality of angled teeth of the toothed insert.

10. The method of claim 8, wherein the ratchet mechanism is pivotally coupled to the first tubular member using a threaded bolt such that the ratchet mechanism is removable upon removal of the threaded bolt.

11. The method of claim 8, further comprising:
  inserting a threaded bolt into the first recessed area of the first tubular member, the threaded bolt configured to prevent the first plurality of angled teeth of the ratchet mechanism from vertically disengaging from the second plurality of angled teeth of the toothed insert.

12. The method of claim 8, wherein the ratchet mechanism is pivotally coupled to the first threaded tubular member using a threaded bolt such that when the first plurality of angled teeth of the ratchet mechanism are engaged with the second plurality of angled teeth of the toothed insert, the ratchet mechanism is removable upon removal of the threaded bolt.

13. The method of claim 8, wherein the first threaded tubular member is a male pin connector and the second threaded tubular member is a female box connector.

14. The method of claim 8, wherein the first and second plurality of angled teeth comprise an angled leading edge and a flat lagging edge.

15. The method of claim 8, wherein decoupling of the first and second tubular members is prevented by the spring being expandable to engage the first plurality of angled teeth of the ratchet mechanism with the second plurality of angled teeth of the toothed insert.

16. A pivoting, vertical ratcheting anti-rotation device comprising:
  a ratchet mechanism pivotally coupled at a proximal end to a first tubular member within a first recessed area located on a first shoulder of the first tubular member, a distal end of the ratchet mechanism comprises a first plurality of angled teeth and a spring allowing the ratchet mechanism to pivot in a vertical direction within the first recessed area;
  a toothed insert mechanically coupled to a second tubular member in a second recessed area located on a second shoulder of the second tubular member, the toothed insert comprising a second plurality of angled teeth positioned to engage the first plurality of angled teeth of the ratchet mechanism;
  wherein during coupling of the first and second tubular members, the spring is compressible to allow the ratchet mechanism to move vertically over the second plurality of angled teeth of the toothed insert; and
  wherein decoupling of the first and second tubular members is prevented by engagement of the first plurality of angled teeth of the ratchet mechanism with the second plurality of angled teeth of the toothed insert, which is initiated by the expansion of the spring.

17. The anti-rotation device of claim 16, further comprising a locking bolt mechanically coupled at the distal end of the ratchet mechanism, wherein when the first and second tubular members are coupled, the locking bolt is installable, retaining the first plurality of angled teeth of the ratchet mechanism with the second plurality of angled teeth of the toothed insert.

18. The anti-rotation device of claim 16, wherein the ratchet mechanism is pivotally coupled to the first threaded tubular member using a threaded bolt such that when the first plurality of angled teeth of the ratchet mechanism are engaged with the second plurality of angled teeth of the toothed insert the ratchet mechanism is removable upon removal of the threaded bolt.

19. The anti-rotation device of claim 16, further comprising a threaded hole within the first recessed area, wherein the threaded hole is configured to receive a threaded bolt to prevent the first plurality of angled teeth of the ratchet mechanism from vertically disengaging from the second plurality of angled teeth of the toothed insert.

20. The anti-rotation device of claim 16, wherein the first and second plurality of angled teeth comprise an angled leading edge and a flat lagging edge.

* * * * *